United States Patent
Casilli

(10) Patent No.: US 9,690,265 B2
(45) Date of Patent: Jun. 27, 2017

(54) MOBILE DEVICE WITH AUTOMATIC ACQUISITION AND ANALYSIS OF BUILDING AUTOMATION SYSTEM

(75) Inventor: Chris Casilli, Morriston, FL (US)

(73) Assignee: SIEMENS INDUSTRY, INC., Alpharetta, GA (US)

(*) Notice: Subject to any disclaimer, the term of this patent is extended or adjusted under 35 U.S.C. 154(b) by 713 days.

(21) Appl. No.: 13/549,060

(22) Filed: Jul. 13, 2012

(65) Prior Publication Data

US 2014/0018940 A1 Jan. 16, 2014

(51) Int. Cl.
G05B 13/02 (2006.01)
G05B 13/04 (2006.01)
G05B 15/02 (2006.01)

(52) U.S. Cl.
CPC ........... *G05B 13/048* (2013.01); *G05B 15/02* (2013.01)

(58) Field of Classification Search
CPC ...................................................... G05B 15/02
USPC ................. 700/29, 83, 286–296; 706/12, 14
See application file for complete search history.

(56) References Cited

U.S. PATENT DOCUMENTS

| | | | |
|---|---|---|---|
| 6,167,464 A | 12/2000 | Kretschmann | |
| 7,194,446 B1 | 3/2007 | Bromley et al. | |
| 2006/0065750 A1* | 3/2006 | Fairless | 236/46 R |
| 2007/0179645 A1* | 8/2007 | Nixon | G05B 19/042 700/83 |
| 2007/0181701 A1* | 8/2007 | Cheng | F24F 3/0442 236/49.3 |
| 2008/0231437 A1* | 9/2008 | Singhal | F24F 11/0009 340/514 |
| 2011/0040393 A1 | 2/2011 | Cheng et al. | |
| 2011/0153034 A1 | 6/2011 | Philliben et al. | |
| 2011/0246898 A1* | 10/2011 | Imes et al. | 715/735 |
| 2012/0259469 A1* | 10/2012 | Ward et al. | 700/276 |
| 2012/0259583 A1* | 10/2012 | Noboa et al. | 702/179 |

FOREIGN PATENT DOCUMENTS

| | | |
|---|---|---|
| CN | 1647005 A | 7/2005 |
| CN | 101013318 A | 8/2007 |
| CN | 102151605 A | 8/2011 |
| CN | 102301288 A | 12/2011 |
| EP | 2 136 274 A1 | 12/2009 |
| WO | 2011072332 A1 | 6/2011 |

OTHER PUBLICATIONS

International Search Report of Application No. PCT/US2013/050175 dated Sep. 25, 2013.

* cited by examiner

*Primary Examiner* — Ziaul Karim

(57) ABSTRACT

A building automation system includes a plurality of components, with each of the plurality of components associated with point data. A method of controlling the building automation system includes establishing communications between a mobile computing device and a building automation network of the building automation system. The method further includes receiving point data from the building automation system via the building automation network. In addition, the method includes identifying a plurality of components of the building automation system based on the point data received from the at least one building automation network and generating a model of the building automation system based on the point data.

20 Claims, 7 Drawing Sheets

MOBILE DEVICE WITH AUTOMATIC ACQUISITION AND ANALYSIS OF BUILDING AUTOMATION SYSTEM

FIELD

This application relates to the field of building systems, and more particularly to devices and methods for improving the performance of building automation systems.

BACKGROUND

Traditionally, a manual process was utilized to determine system performance metrics and related optimization strategies for building systems such as a heating, ventilation and air conditioning (HVAC) systems. This manual process included manual collection of the HVAC system's performance data sets and a manual analysis and evaluation of which strategy to select. During this manual process a field engineer would visit the site of the HVAC system and manually record system parameters (e.g. temperatures, energy consumption, fans speed, etc.) from the actual HVAC system. The data would then be recorded on forms and other tallying documents. In some situations, the HVAC system may have been associated with a building automation system such that the field engineer could extract system parameters from the Building Automation System (BAS). Such system parameters were typically provided via paper reports or electronic reporting means. This manually collected information would then be either manually analyzed or feed into separate analysis system to determine if and how the system could be modeled or possibility optimized. From that point the system's optimization and analysis was based strictly on the single statically collected data set.

While the above manual processes for determining HVAC and other building system performance metrics and related optimization strategies could be somewhat effective, they tended to be inefficient and limited based on the use of limited data. Accordingly, it would be desirable to provide a system and method that more easily and efficiently determined performance metrics and optimization strategies for an HVAC system and other building systems.

SUMMARY

In accordance with one embodiment of the disclosure, there is provided a method of controlling a building automation system. The building automation system includes a plurality of components, and each of the plurality of components is associated with point data. The method includes establishing communications between a mobile computing device and a building automation network of the building automation system. The method further includes receiving point data from the plurality of components of the building automation system via the building automation network. In addition, the method includes identifying the at least one component of the building automation system based on the point data received from the at least one component. Furthermore, the method includes generating a model of the building automation system based on the point data.

Pursuant to another embodiment of the disclosure, there is provided an arrangement comprising a building automation system and a mobile computing device. The building automation system includes a plurality of components, each of the plurality of components associated with point data. The mobile computing device is in wireless communication with the building automation system such that the mobile computing device can receive point data from the building automation system. The mobile computing device is further configured to identify the plurality of components of the building automation system based on the received point data and generate a model of the building automation system based on the received point data.

Pursuant to yet another embodiment, a method of improving the performance of an HVAC system including a building automation system includes wirelessly connecting a mobile computing device to a network of the building automation system. The method further includes receiving point data associated with the building automation system at the mobile computing device. In addition, the method includes generating a model of the building automation system in the mobile computing device based at least in part on the received point data. Additionally, the method includes performing impulse response testing on the building automation system using commands sent wirelessly from the mobile computing device to the building automation system. Furthermore, the method includes generating an optimization strategy for the building automation system on the mobile computing device, the optimization strategy based at least in part on the model of the building automation system.

The above described features and advantages, as well as others, will become more readily apparent to those of ordinary skill in the art by reference to the following detailed description and accompanying drawings. While it would be desirable to provide a system and method that provides one or more of the above or other advantageous features, the teachings disclosed herein extend to those embodiments which fall within the scope of the appended claims, regardless of whether they accomplish one or more of the above-mentioned advantages.

DESCRIPTION

Figure 1:
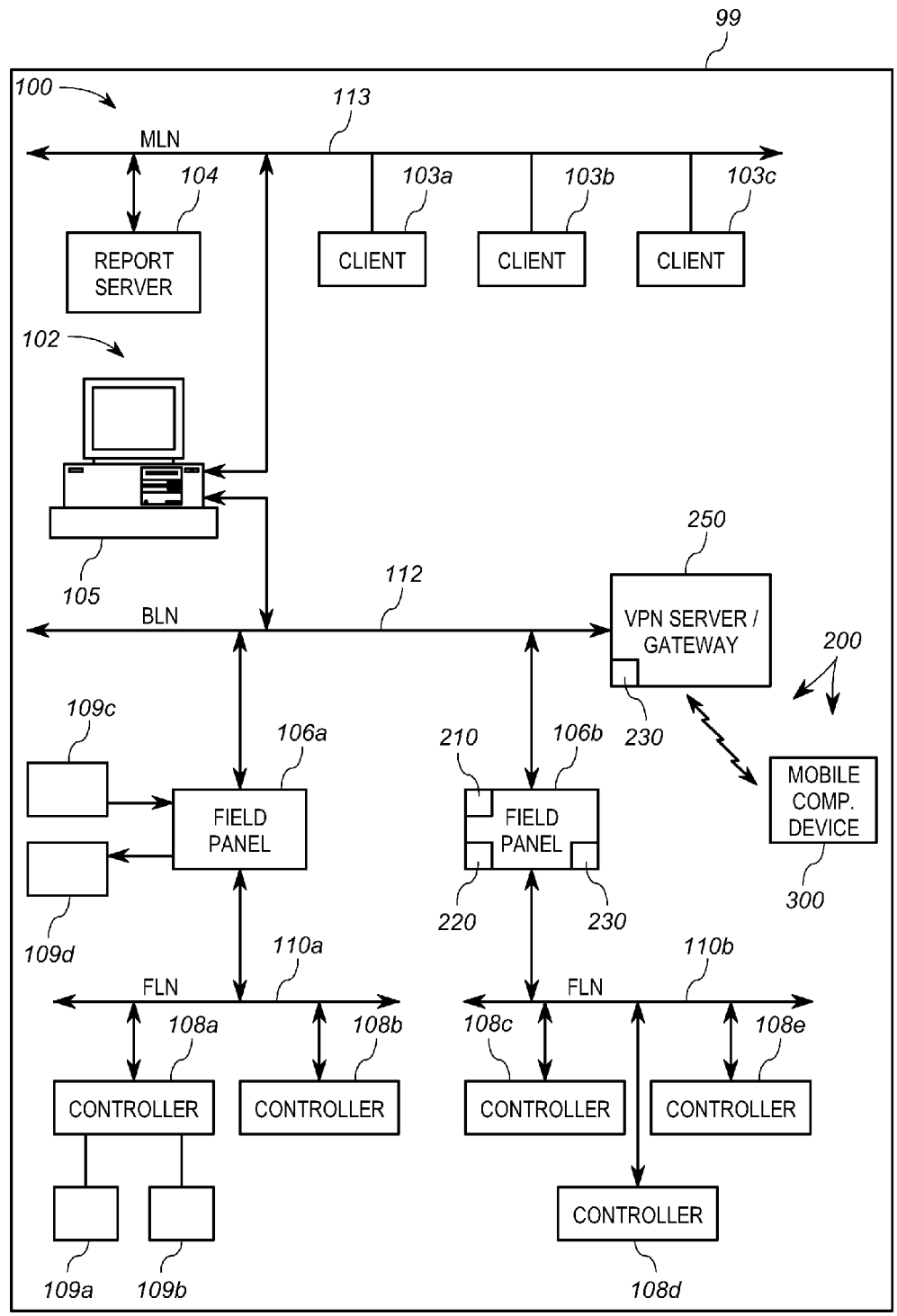
FIG. 1 shows an exemplary block diagram of a building automation system with a mobile computing device in association with the building automation system in accordance with embodiments of the present invention.

With respect to FIG. 1, a building automation system (BAS) 100 is shown positioned within a building 99. The building 99 may be any of structure used for any of various purposes including residential, recreational, commercial, industrial, educational or other purposes. The BAS 100 is in communication with a mobile computing device 300. As explained in further detail below, the mobile computing device includes a BAS mobile app 322 configured to establish communications between the mobile computing device and the BAS, collect data from the BAS, identify a plurality of components of the BAS, generating a model of the BAS, test the BAS, and determine optimization strategies for the BAS.

Building Automation System

The building automation system 100 depicted in FIG. 1 is a distributed building system that provides control functions for the HVAC system of a building. While the BAS in FIG. 1 is described as being associated with or including an HVAC system, it will be recognized by those of ordinary skill in the art that the BAS may be any type of BAS for use in association with or including various building systems, including environmental control systems, security systems, life or fire safety systems, industrial control systems and/or the like. An example of a BAS is the Apogee® building automation system available from Siemens Industry, Inc., Building Technologies Division of Buffalo Grove, Ill. The Apogee® building automation system allows the setting and/or changing of various controls of the system, generally as provided below. While a brief description of an exemplary BAS is provided in the paragraphs below, it should be appreciated that the building automation system 100 described herein is only an exemplary form or configuration for a building automation system.

With continued reference to FIG. 1, the building automation system 100 includes at least one supervisory control system or workstation 102, client workstations 103a-103c, report server 104, a plurality of field panels represented by field panels 106a and 106b, and a plurality of controllers represented by controllers 108a-108e. It will be appreciated, however, that wide varieties of BAS architectures may be employed.

Each of the controllers 108a-108e represents one of plurality of localized, standard building control subsystems, such as space temperature control subsystems, lighting control subsystems, or the like. Suitable controllers for building control subsystems include, for example, the model TEC (Terminal Equipment Controller) available from Siemens Industry, Inc., Building Technologies Division, of Buffalo Grove, Ill. To carry out control of its associated subsystem, each controller 108a-108e connects to one or more field devices, such as sensors or actuators, shown by way of example in FIG. 1 as the sensor 109a and the actuator 109b connected to the controller 108a.

Typically, a controller such as the controller 108a effects control of a subsystem based on sensed conditions and desired set point conditions. The controller controls the operation of one or more field devices to attempt to bring the sensed condition to the desired set point condition. By way of example, consider a temperature control subsystem that is controlled by the controller 108a, where the actuator 109b is connected to an air conditioning damper and the sensor 109a is a room temperature sensor. If the sensed temperature as provided by the sensor 109a is not equal to a desired temperature set point, then the controller 108a may further open or close the air conditioning damper via actuator 109b to attempt to bring the temperature closer to the desired set point. It is noted that in the BAS 100, sensor, actuator and set point information may be shared between controllers 108a-108e, the field panels 106a-106b, the work station 102 and any other elements on or connected to the BAS 100.

To facilitate the sharing of such information, groups of subsystems such as those connected to controllers 108a and 108b are typically organized into floor level networks or field level networks ("FLNs") and generally interface to the field panel 106a. The FLN data network 110a is a low-level data network that may suitably employ any suitable proprietary or open protocol. Subsystems 108c, 108d and 108e along with the field panel 106b are similarly connected via another low-level FLN data network 110b. Again, it should be appreciated that wide varieties of FLN architectures may be employed.

The field panels 106a and 106b are also connected via a building level network ("BLN") 112 to the workstation 102 and the report server 104. The field panels 106a and 106b thereby coordinate the communication of data and control signals between the subsystems 108a-108e and the supervisory computer 102 and report server 104. In addition, one or more of the field panels 106a, 106b may themselves be in direct communication with and control field devices, such as ventilation damper controllers or the like. To this end, as shown in FIG. 1, the field panel 106a is operably connected to one or more field devices, shown for example as a sensor 109c and an actuator 109d.

The workstation 102 provides overall control and monitoring of the building automation system 100 and includes a user interface. The workstation 102 further operates as a BAS data server that exchanges data with various elements of the BAS 100. The BAS data server can also exchange data with the report server 104. The BAS data server (e.g., workstation 102) allows access to the BAS system data by various applications. Such applications may be executed on the workstation 102 or other supervisory computers, not shown.

The workstation 102 is operative to accept modifications, changes, alterations and/or the like from the user. This is typically accomplished via a user interface 105 for or of the computer 102. The user interface may include a keyboard, touchscreen, mouse, or other interface components. The workstation 102 is operable to, among other things, affect or change operational data of the field panels 106a, 106b as well as other components of the BAS 100. The field panels 106a and 106b utilize the data and/or instructions from the workstation 102 to provide control of their respective controllers.

The workstation 102 is also operative to poll or query the field panels 106a and 106b for gathering data. The workstation 102 processes the data received from the field panels 106a and 106b, including trending data. Information and/or data is thus gathered from the field panels 106a and 106b in connection with the polling, query or otherwise, which the workstation 102 stores, logs and/or processes for various uses. To this end, the field panels 106a and 106b are operative to accept modifications, changes, alterations and/or the like from the user.

The workstation 102 also preferably maintains a database associated with each field panel 106a and 106b. The database maintains operational and configuration data for the associated field panel. The report server 104 stores historical data, trending data, error data, system configuration data, graphical data and other BAS system information as appropriate. In at least one embodiment, the building information database 210 and the user database 220 of the BAS 100 is provided by the BAS data server (e.g., workstation 102). In other embodiments the building information database 210 and the user database 220 may be stored elsewhere. For example, as shown in FIG. 1, the building information database 210 and the user database 220 may be stored on the field panel 106b.

The management level network (MLN) 113 may connect to other supervisory computers, Internet gateways, or other gateways to other external devices, as well as to additional network managers (which in turn connect to more subsystems via additional low level data networks). The supervisory computer 102 uses the MLN 113 to communicate BAS data to and from other elements on the MLN 113. The MLN 113 may suitably comprise an Ethernet or similar wired network and may employ TCP/IP, BACnet, Modbus, and/or other protocols that support high speed data communications.

The BAS 100 may further include or be connected to various additional components. For example, as shown in FIG. 1, a mobile computing device 300 is configured for wireless communications with the BAS 100 via a building automation network made available by a wireless access point 230 provided on a virtual private network (VPN) server/gateway 250 coupled to the BLN 112.

While various members of the BAS are shown in FIG. 1 as being associated with one of the field panels (e.g., field panel 106b), it will be recognized that in other embodiments these and other BAS members may be differently positioned in or connected within the BAS 100. For example, the building information database 210, the user database 220, and the wireless access point 230 of the BAS could be provided on the workstation 102. Alternatively, the building information database 210 and the user database 220 could be housed separately from those components shown in FIG. 1, such as in a separate computer device that is coupled to the building level network 112 or other BAS location. Such a separate computer device could also be used to store BAS operational software. Similarly, the wireless access point 230 of the BAS 100 could be housed within the workstation 102 or within a separate computer device coupled to the building level network 112 of the BAS 100.

Mobile Computing Device

Figure 2:
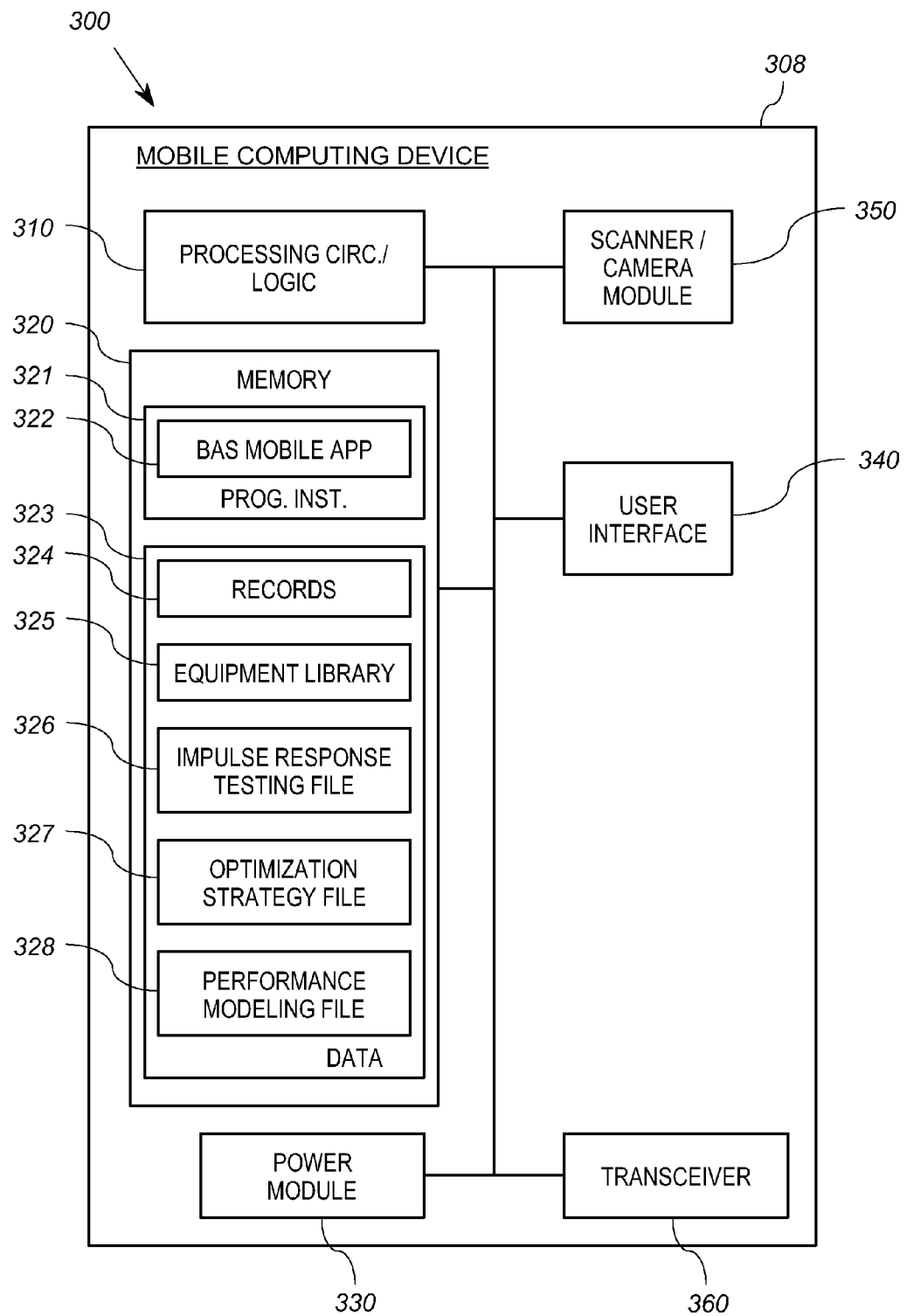
FIG. 2 shows an exemplary internal block diagram of a mobile computing device for use in association with the building automation system of FIG. 1.

With reference now to FIG. 2, a block diagram of an exemplary mobile computing device 300 configured for wireless communication with the BAS 100 is shown. The mobile computing device 300 may be provided by any mobile device capable of being carried by a human and communicating with the BAS 100 via the wireless access point 230 (e.g., using WiFi connectivity). For example, the mobile computing device 300 may be a laptop computer, a tablet computer, smartphone, personal digital assistant or any of various other mobile computing devices, as will be recognized by those of ordinary skill in the art. Exemplary mobile computing devices include Droid® and iPhone® smartphones, iPod® devices, and iPad Touch® tablet computers.

The mobile computing device 300 of FIG. 2 includes a housing, case or the like 308 that is configured in a typical manner for a mobile computing device. The mobile computing device 300 further includes processing circuitry/logic 310, a memory 320, a power module 330, a user interface 340, and a wireless transceiver 360, all positioned within the housing. In addition, the mobile computing device may further comprise a camera/scanner module 350. It will be appreciated by those of ordinary skill in the art that the embodiment of the mobile computing device 300 shown in FIG. 2 is only an exemplary embodiment of a mobile computing device configured for communication with the BAS 100 over a wireless network and the mobile computing device 300 may include other components not shown to avoid obscuring aspects of the present invention.

The processing circuitry/logic 310 is operative, configured and/or adapted to operate the mobile computing device 300 including the features, functionality, characteristics and/or the like as described herein. To this end, the processing circuit 310 is operably connected to all of the elements of the mobile computing device 300 described below. The processing circuitry/logic 310 is typically under the control of program instructions or program instructions 321 contained in the memory 320, as explained in further detail below.

The power module 330 of the mobile computing device 300 is operative, adapted and/or configured to supply appropriate electricity to the mobile computing device 300 and its various components. The power module 330 is generally DC power supplied by a battery or batteries.

The wireless computing device 300 further includes a user interface 340. The user interface 340 allows the mobile computing device 300 to present information to the user, and also allows the user to insert data into the mobile computing device 300. Accordingly, the user interface 340 may be configured to drive a touchscreen, keypad, buttons, speaker, microphone, or any of various other standard user interface devices.

A camera/scanner module 350 may also be provided on the mobile computing device 300. The camera/scanner module 350 is configured to scan bar codes or otherwise read indicia configured to provide data concerning various components of the BAS 100 or other systems.

The transceiver 360 of the mobile computing device 300 is configured to communicate with the WAN 55 via the wireless access point 230. This communication includes the transmission of data both from the mobile computing device 300 to the BAS 100 and from the BAS 100 to the mobile computing device 300. The transceiver is configured to communicate according to the same protocol as the wireless access point 230. Such protocols may include those using IEEE 802.11 standards, such as WiFi, Bluetooth® or ZigBee® protocols.

The memory 320 may be provided in any of various forms as will be recognized by those of ordinary skill in the art, including volatile and non-volatile memory devices, such as RAM, ROM, NVRAM or other memory devices. The memory is configured to retain both program instructions 321 and data 323 for use by the mobile computing device 300. With respect to program instructions 321, the memory 320 includes various programs that may be executed by the processor 310. For example, the memory 320 in the mobile communications device 300 of FIG. 2 includes a BAS data acquisition and analysis application 322 (the "BAS mobile application"). The BAS mobile application 322 is configured to facilitate data acquisition from the BAS 100 and its components and conduct BAS testing and optimization strategies. To this end, the BAS mobile application 322 is configured to obtain data from the BAS 100 using the transceiver 360 in communication with the VPN server 250 (see FIG. 1). The BAS mobile application 322 is also configured to display the data via the user interface 340 (and associated screen) of the mobile computing device 300. In addition, the BAS mobile application 322 is configured to provide data to the BAS 100 using the transceiver 360 in communication with the VPN server 250. Operation of the BAS mobile application will be explained in further detail below.

In addition to the program instructions 321, the memory 320 of the mobile computing device 300 also includes data 323. The data 323 includes records 324 of current and historical data related to operation of the BAS 100 and the mobile computing device 300. For example, the records 324 may include point data related to components identified by the BAS, as explained in further detail below. In addition to the records file 324, the memory 320 includes a number of additional files containing data for use during operation of the BAS mobile application 322. For example, the memory includes an equipment library 325, an impulse response testing file 326, an optimization strategy file 327 and a performance modeling file 328. The equipment library 325 includes data related to various sensors, control devices, and other equipment that may be utilized by a BAS 100. The impulse response testing file 326 includes data concerning impulse testing that may be performed on the BAS 100. The optimization strategy file includes data related to optimization of the BAS 100 based on the impulse testing data. The performance modeling file 328 includes data related to performance modeling for the BAS based on a selected optimization strategy. A further description of the operation of each of the programs and data files of the memory is described in further detail below.

BAS Mobile App

The BAS mobile app 322 is configured for use in a structure including an HVAC or other system controlled by a BAS. The BAS mobile app 322 is configured to automatically determine what HVAC components are associated with the BAS 100 and analyze the performance of the HVAC system. In addition, the BAS mobile app 322 is configured to select optimization strategies for improved operation of the HVAC system, and simulate the strategies on the mobile computing device 300 for the user to assess and evaluate in real time. The BAS mobile app 322 determines dynamic mathematical models that are used to further simulate, analyze, and report the predicted use of possible optimization strategies.

BAS Detection with the BAS Mobile App

As mentioned above, the BAS mobile app 322 is designed to automatically detect and acquire the necessary data from the BAS for use in performing the desired analysis. To facilitate this function, the BAS mobile app 322 directly communicates with the HVAC system's controller via known communications protocols e.g. BACnet, Modbus, or other published protocols. This automated process avoids the need to manually collect data and transfer it from one system to another via manual or other means.

Communication between the mobile computing device 300 and the BAS 100 begins when the BAS mobile app 322 is logged on to the VPN or WiFi network and detects the existence of the BAS 100. At this time, the mobile computing device 300 transmits user identification data that is unique to the mobile computing device 300 to the BAS 100. This unique identification data may be, for example, a communications address for the mobile computing device 300, or some additional unique identifier. The unique identification data allows the BAS 100 to identify the particular user/mobile computing device 300 within the building. Accordingly, a two way communication link between the BAS 100 and the mobile computing device 300 is established, as the BAS 100 has a network address for the mobile computing device 300, and the mobile computing device has a network address for the BAS 100 (i.e., the network address derived from the PWHL).

Once communications is established between the mobile computing device 300 and the BAS 100, the BAS mobile app 322 may be used in several different modes to extract information required to build a model of the BAS 100. These modes include both an automatic mode and a manual mode.

Automatic Mode Data Collection

If the BAS mobile app 322 is operating in the automatic mode, the mobile computing device 300 automatically begins extracting the system's performance characteristics upon connection to the VPN. In particular, the BAS mobile app 322 monitors BAS wireless communications to obtain BAS data.

In the automatic data collection mode, the BAS mobile app 322 first queries the BAS 100 for self-describing devices, such as container objects, as described in more detail below. If such self-describing devices exist, they are used by the BAS mobile app 322 to collect the required information. If these self-describing devices don't exist, if they exist in limited quantities, or if the quality of the data is incomplete or low, the BAS mobile app 322 will continue with an auto discovery of the data associated with the BAS 100.

Specific BAS data is generally configured as a point data structure (also referred to herein as a "point"). Point data structures generally exist in an electronic data format in a memory of a field controller or field panel of the BAS (e.g., field panel 106a or controller 108a in FIG. 1) and/or in a BAS server database (e.g., VPN server 250 in FIG. 1). The BAS mobile app 322 is configured to query the BAS via the VPN (or other network) for such point data structures in order to determine the configuration of the BAS 100.

Point data structures may have several parameters such as "Point Type", "Point Name", "Point Address", "Point Value", "Point Description", "Point Engineering Units", etc. The "Point Type" parameter is generally a type of point that the data structure represents. Exemplary point types include analog input points, analog output points, analog value points, a binary input point, a binary output point, as well as additional point types as will be recognized by those of ordinary skill in the art. The "Point Name" parameter is used to identify the point data structure based upon a text based name (e.g., FL.GNV.B10.L2.RM232.AHU.VAV23: ROOM). The "Point Address" parameter uniquely identifies the point data structure within the BAS (e.g., 1.2.3). The "Point Value" parameter indicates the current value of the point data structure and may be provided in different data types including floating point values, digital values, text, time/date, etc. (e.g., 73.5). The "Point Description" is a text based parameter intended to provide a specific textual description of the point (e.g., "Room 323 Temperature"). The "Point Engineering Units" parameter identifies the units associated with the point value (e.g., degrees Fahrenheit). It will be recognized by those of ordinary skill in the art that numerous other point parameters are possible. The format of the point data structure can be based upon public standards (e.g. ANSI/ASHRAE Standard 135-2008 BACnet) or company proprietary formats. It will be recognized by those of ordinary skill in the art that points may also be configured as an object in the Object Oriented Programming (OOP) realm. OOP based points include attributes (data structure) as well methods (services or functions the point can carry out).

Point data structures may be provided in any of several different forms, depending on the many different configuration parameters assigned. Of these different options, one may include a physical point data structure, which is a manifestation of a physical entity. This could include both input and output devices. (e.g., temperature sensors, pressure sensors, velocity sensors, etc) or actuators (e.g., motors, relays, solenoids, etc). Another possible format is a virtual point structure which does not have a physical connection (e.g., input or output device), but which can be assigned values and used in calculations.

Using the points collected from the BAS 100, the BAS mobile app 322 is configured to determine various components of the BAS and the associated HVAC system. To this end, the equipment library 325 is pre-loaded with information about various BAS systems and components that may be present in any given BAS system. The BAS mobile app 322 is capable of determining the specific make and model of a component associated with collected point data by comparing the collected point data to the data stored in the equipment library. In particular, the BAS mobile app 322 may search the equipment library 325 for a particular data tag and operational characteristics that most align with that of a collected point. When a match is found, the BAS mobile app 322 recognizes that the component is present in the BAS system, and information on the component is stored in a file along with the overall system configuration for the BAS 100.

Point data structures typically provide current point data structure parameter values. However, in at least one embodiment, the BAS also stores historical point data which is used to obtain a more complete picture of the BAS 100. To facilitate the storage and review of historical point data parameters, additional data objects may be used, such as trend objects.

Figure 3:
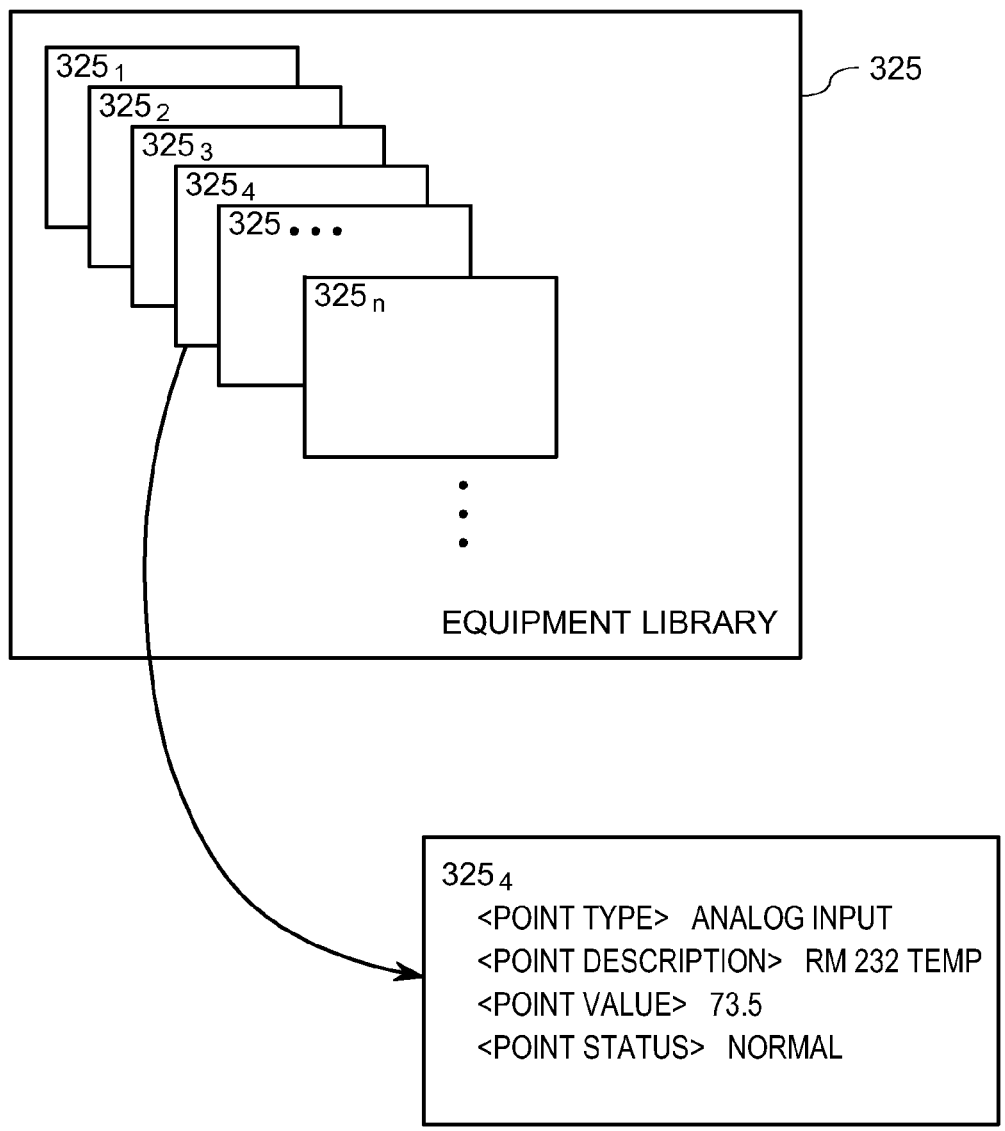
FIG. 3 shows an diagram of files in an equipment library of the memory of the mobile computing device of FIG. 2.

As the BAS mobile app 322 collects both real-time and historically trended point data from the BAS, the data is analyzed and information concerning the BAS 100 is stored in various files in the memory 320 of the mobile computing device 300. For example, FIG. 3 shows the equipment library data file 325. As mentioned previously, the equipment library 325 includes a database file containing all equipment in the BAS 100. The equipment library 325 is created within the mobile computing device 300 based on the point data collected from the BAS 100. In the exemplary embodiment of FIG. 3, the equipment library includes records $325_1$-$325_n$. Each record includes point data related to a particular piece of equipment in the BAS 100. For example, record $325_4$ includes point data related a temperature sensor in the BAS. Parameters related to the temperature sensor include the point type ("analog input", point description ("Rm232Temp"), point value ("73.5"), and point status ("normal"), as well as various additional parameters not shown in FIG. 3.

Once all the points have been identified by the BAS mobile app 322, the points are filtered and processed based upon several different groupings and filter mechanisms. For example, the points may be grouped and processed by point name, point description, point value, point units, panel association, or other point parameter.

A grouping based on the point name parameter may be used when point names are encoded with a point naming convention that allows for grouping the points into various locations, systems and/or subsystems. For example, the point name parameter may be used to determine that a particular point exists on the 2nd floor, area A, in room 232. Similarly, a grouping based on the point description parameter may be used if the point description field includes the system and location information.

A grouping based on the point value parameter may be used based on the signature of the value of certain points. For example, digital points only have a value of a one or a zero whereas analog temperature sensors for room spaces typically have a range of values between 68-80 degrees. Other system points such as chilled water will have a value in the range of 38-48 Degree F. Other examples of points with different point values include steams, air statics pressure, exhaust system (having a negative value), etc. The point value parameter may be used in conjunction with impulse testing to determine if the point is associated with the system in question. Additional logic tests may also be performed on the point and BAS component pairs to determine their relationship, if any at all.

A grouping based on the point units may also be used based on the information provided by the units themselves. For example, a point units of "Deg F" would indicate a temperature grouping whereas "inches $H_2O$" would indicate a pressure typically of air, and "PSI" would indicate a water pressure.

A grouping based on panel association may also be used, as all points are generally associated with a field panel of the BAS. Information about the point may therefore be obtained from the association of the point with a particular field panel. For example, a particular field panel may serve only a single floor or area of a building, and all points associated with that field panel would therefore be associated with such floor or area.

One additional mechanism for processing individual points involves examining the programming logic of the BAS to extract point association with various systems and there functions. Accordingly, the BAS mobile app 322 may recognize an association between two points that would otherwise be unknown based on analysis of the BAS programming logic.

As set forth above, the BAS mobile app is configured to organize points collected from the BAS 100 into hierarchical structures (e.g. major systems, area systems, systems, subsystems, components, etc.) and location based association (e.g. building, level, area, room) container objects exists. Container objects are one means that may be used to facilitate this task. In short, container objects provide a means to query an object and determine the interconnection and association of the various points and components within systems and locations. As a result, the container objects allow the BAS to be represented so a user can understand its various parts, features, and functions.

A container object organizes each point data structure and a description or other means to identify the internal components of the container. These container objects can store other container objects as well to allow for a complete organization of point data objects into their actual location and functional uses.

The use of container objects is dependent upon their existence before queries are made. If containers don't exist, the discovery of the various points and associated functions must be determined by other means, such as manual means. A container object may be formed either locally in the BAS mobile device 300 or in a field controller of the BAS 100. If the functionality exists within the field controller of the BAS 100, the container object is created and then can also be used by another user or system at a later date.

Field panels or controllers (such as field panels 106a and 106b) that hold point data structures along with container objects may also have sub-controllers attached (such as 108a or 108b). These sub-controller(s) also come in different forms and function types. At the more specific function level the sub-controller is an application specific controller (ASC) and has a pre-defined points list and application program. These devices usually have the ability to select a specific use application from a list of pre-defined applications that determines its specific use (e.g., variable air volume (VAV) terminal box controllers). These ASCs typically reside on a Floor Level Network (FLN) 110a or 110b of the BAS 100 which is then connected to a higher level controller such as field panel 106a.

The point data structures and functions of application specific controllers (ASC) may be published and available for access. Through the use of query mechanisms the application number is determined. This number indicates which specific points list and functions are being implemented by the application specific controller. Once the application number is determined, the data layout of the ASC device is complete.

As an example of possible container structures, consider the following containers for a particular building located in Gainesville, Fla.:

Container: Gainesville.Building1.SubContainers[{ }]
(subcontainers include {building levels[{ }], building systems[{ }], and building utilities[{ }])
Container: Gainesville.Building #1.Levels[{ }]
(levels include Level1[{ }], Level 2[{ }] and Level3[0])
Container: Gainesville.Building #1.Level1.Areas[{ }]
(areas include AreaA[{ }], AreaB[{ }] and AreaC[{ }])
Container: Gainesville.Building#1.Level1.AreaA.Rooms[{ }]
(rooms include RM101[0], RM102[{ }], and RM103[{ }])
Container: Gainesville.Building#1.Level1.AreaA.RM101[{ }]
(RM101 subcontainers include PhysicalParameters[{ }], Systems[{ }], and Users[{ }])
Container: Gainesville.Building#1.Level1.AreaA.RM101.PhysicalParameters[{ }]
(PhysicalParameters include
Occupancy Type [Occupancy Type Object],
Space Use [e.g., Office with Copier and Desk],
Max Occupancy [Maximum # of People],
Floor Area [Square Foot Area],
Wall Area [Square Foot Area],
Window Area [Square Foot Area],
Wall Exposure Types [e.g., ENUM (0) External Wall, . . . ],
Wall Exposure Directions [Compass Directions],
Distance to Emergency Exit [Feet])
Container:
Gainesville.Building#1.Level1.AreaA.RM101.Systems[{ }]
(Systems include HVAC[{ }], Security[{ }], Lighting[{ }], FireProtection[{ }], Furniture[{ }])
Container: Gainesville.Building#1.Level1.AreaA.RM101.HVAC[{ }]
(HVAC includes HVACObject[{ }] (e.g., HVACObject [{VAV1}], EnergyModel[{ }])
Container:
Gainesville.Building#1.Level1.AreaA.RM101.HVAC.VAV1[{ }]
(VAV1 includes Points[{ }], Components[{ }], Sub-Systems[{ }], ParentSystems[{ }],//Reference Parent Containers, Document[{ }])
Container:
Gainesville.Building#1.Level1.AreaA.RM101.HVAC.VAV1.Points[{ }]
(Points include Application[Point], Description[Point], Room Temp[Analog-Input Point])
Container:
Gainesville.Building#1.Level1.AreaA.RM101.HVAC.VAV1.RoomTemp
(RoomTemp includes Point Type, Point Name, Point Description, Point Value, Point Address)

Information gathered into container objects may be conveniently stored in various files of the BAS mobile app 322, such as the equipment library 325 of FIG. 3. While the above example includes a number of exemplary containers and data points, it will be appreciated by those of ordinary skill in the art that numerous other containers and data points are possible and contemplated by the disclosure herein.

Manual Mode Data Collection

The manual mode of the BAS mobile app 322 is useful in a closed system, where it is not allowed or not desirable to perform automatic discovery of BAS data. In the manual mode, the BAS mobile app is configured with either the complete system information layout or a partial system information layout with the remaining portions either filled in via automatic discovery, as described above, or simply omitted from the analysis. This manual configuration would include the location and system associations of all the various points within the system. This configuration may be manually assembled via container objects that describe the BAS 100.

As described above, point data structures may be obtained by the mobile computing device 300 automatically or manually. Once the point data structures for the BAS are known to the mobile computing device 300, additional queries and services can be perform on them. For example, through the use of container objects and application specific controller published data sets, a picture of the data structure of the BAS and associated equipment locations are determined. After the data structure of the BAS 100 is determined, the collected data may be used to create a model of current and historical characteristics of the system, as described in further detail below.

BAS Modeling

Based on the collected point information, including data from the equipment library file 325 and other files, the BAS mobile app 322 actively generates a dynamic model of the BAS (e.g., the HVAC system of FIG. 1). This model includes a graphical model that illustrates the physical configuration of the BAS 100, and a mathematical model that represents operation of the BAS. The graphical model may be presented to a user on the user graphical user interface 340 of the mobile computing device 300. It will be noted that the results of the BAS mobile app 322 analysis on the collected point information is not strictly a mathematical equation based model including a set of equations or an outcome look up table. Instead, the analysis includes a creation phase in which the BAS mobile app 322 analyzes indentified components of the BAS and identifies indicative patterns within them, including actual performance characteristics.

Once an indicative pattern is identified for the BAS, the BAS mobile app 322 generates an intelligent agent who is responsible for representing a pattern's characteristics and behaviors in the final model environment. An intelligent agent is a concept from the study of artificial intelligence. The agent acts to provide the best outcome under a given set of conditions. The agent is described mathematically via an agent function which maps a sequence of signals or stimulations to an output of action. This is implemented as a software program identity.

A hierarchy of integrated intelligent agents is built up by the BAS mobile app 322 to represent all the systems under analysis. The environment that the system operates within is also modeled as a collection of interacting agents. These agents interact with the system's agents in both a competitive or cooperative fashion. Agents are also used to model utilities and other sources. Others agents are used to model by-products of the systems (e.g., emissions, heat waste, waste water, etc.). Once these agents have been created to match the actual systems under analysis they can be used to model the systems under various other conditions.

Figure 4:
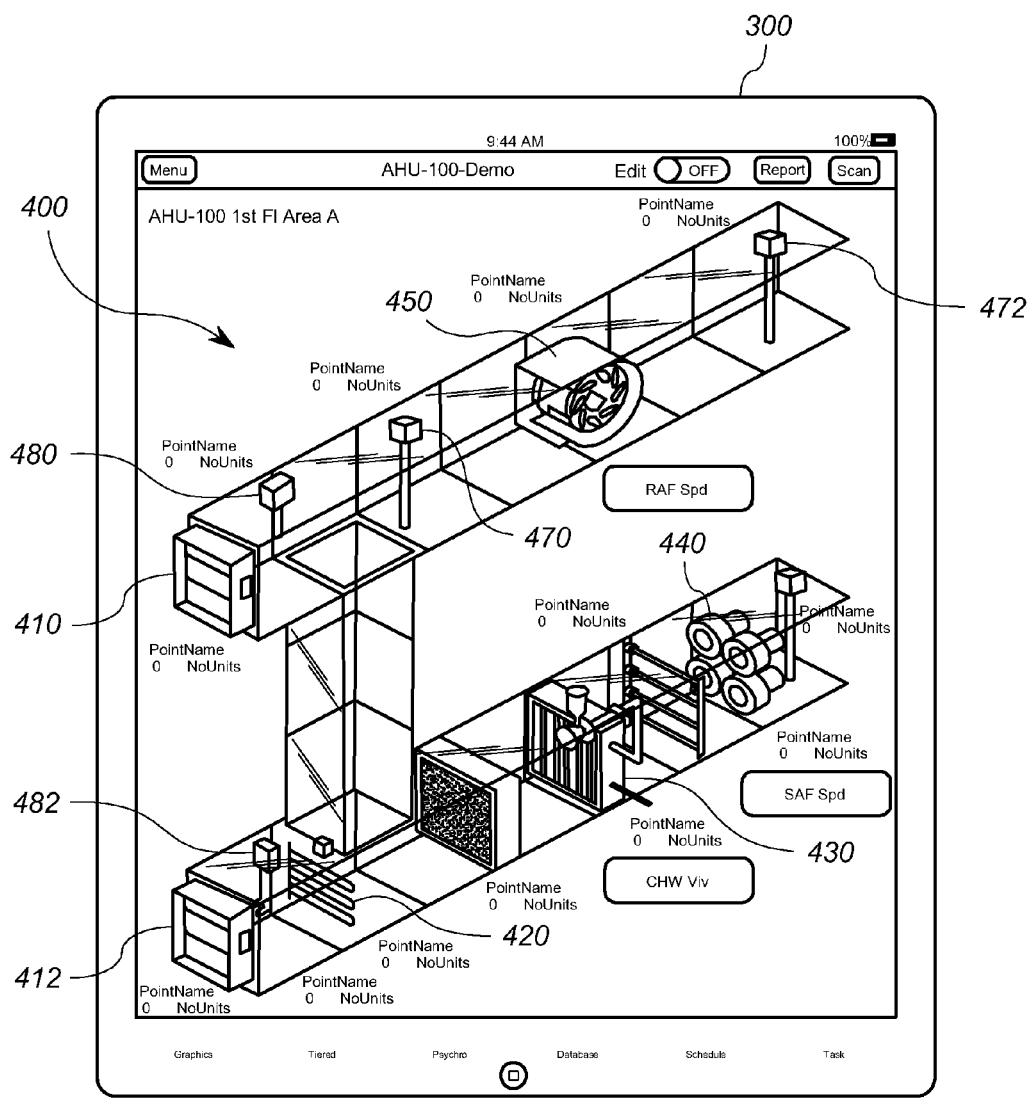
FIG. 4 shows an exemplary screen capture of the mobile computing device of FIG. 2 displaying a graphical model of an AHU of the building automation system.

FIG. 4 shows an exemplary graphical screen of the user interface 340 of the mobile computing device 300 based on information collected about the BAS 100 from the BAS mobile app 322. In particular, the screen of FIG. 4 shows a model of an air handling unit (AHU) 400 of the HVAC system associated with the BAS 100. The BAS mobile device 322 has successfully analyzed point data collected from the BAS 100 to identify various components of the AHU 400, including dampers 410, 412, heating coil 420, chiller 430, supply fan 440, return fan 450, and various sensors including air flow sensors 470, 472, 474, and temperature sensors 480, 482, etc.

Users of the BAS mobile app 322 may obtain additional information about the subsystems and components of the BAS by simply selecting one of the subsystems or components provided on a screen of the mobile computing device 300. Such selections may be made by any of various methods known to those of ordinary skill in the art, including use of a touchscreen, stylus, mouse or other pointing device. When the user makes such a selection, the BAS mobile app 322 provides a new screen on the mobile computing device 300 showing additional information about the selected subsystem or component of the BAS.

Figure 5:
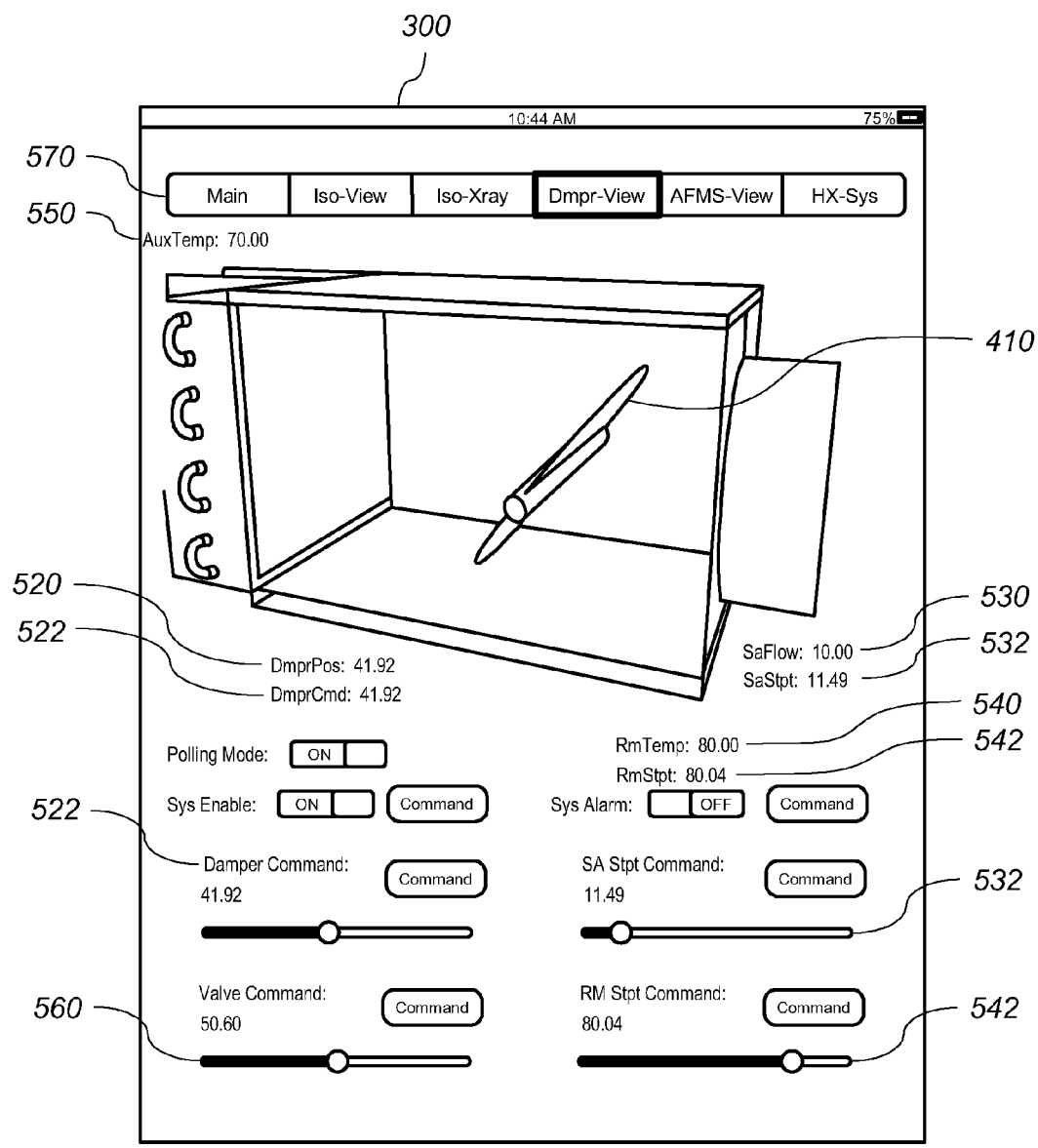
FIG. 5 shows an exemplary screen capture of the mobile computing device of FIG. 2 displaying a graphical model of a damper in the building automation system.

FIG. 5 shows another example of a screen of the user interface 340 of the mobile computing device 300 showing more detail concerning the damper 410 of the AHU of FIG. 4. The screen includes an illustration of the damper 410 and various data related to the damper. For example, the screen of FIG. 5 shows that an actual damper position indicator 520, a damper command indicator 522, an actual airflow indicator 530, and an airflow set point 532, a room temperature 540 associated with the damper 410, a room temperature set point 542, and auxiliary temperature 550, and a valve command 560. A menu 570 allows the user to select various options for providing information about the damper 410.

Modeling of the BAS 100 is not completed following the initial analysis of point data collected from the BAS. Instead, the BAS mobile application 322 regularly updates the assembled model based on newly acquired information on the BAS 100. Newly acquired information on the BAS 100 may be obtained following impulse response testing, regular operation of the BAS, or other means, as described in further detail below. Using this newly acquired information, the BAS mobile application 322 performs advanced regression analysis and model fitting to further determine and improve the BAS model.

Figure 6:
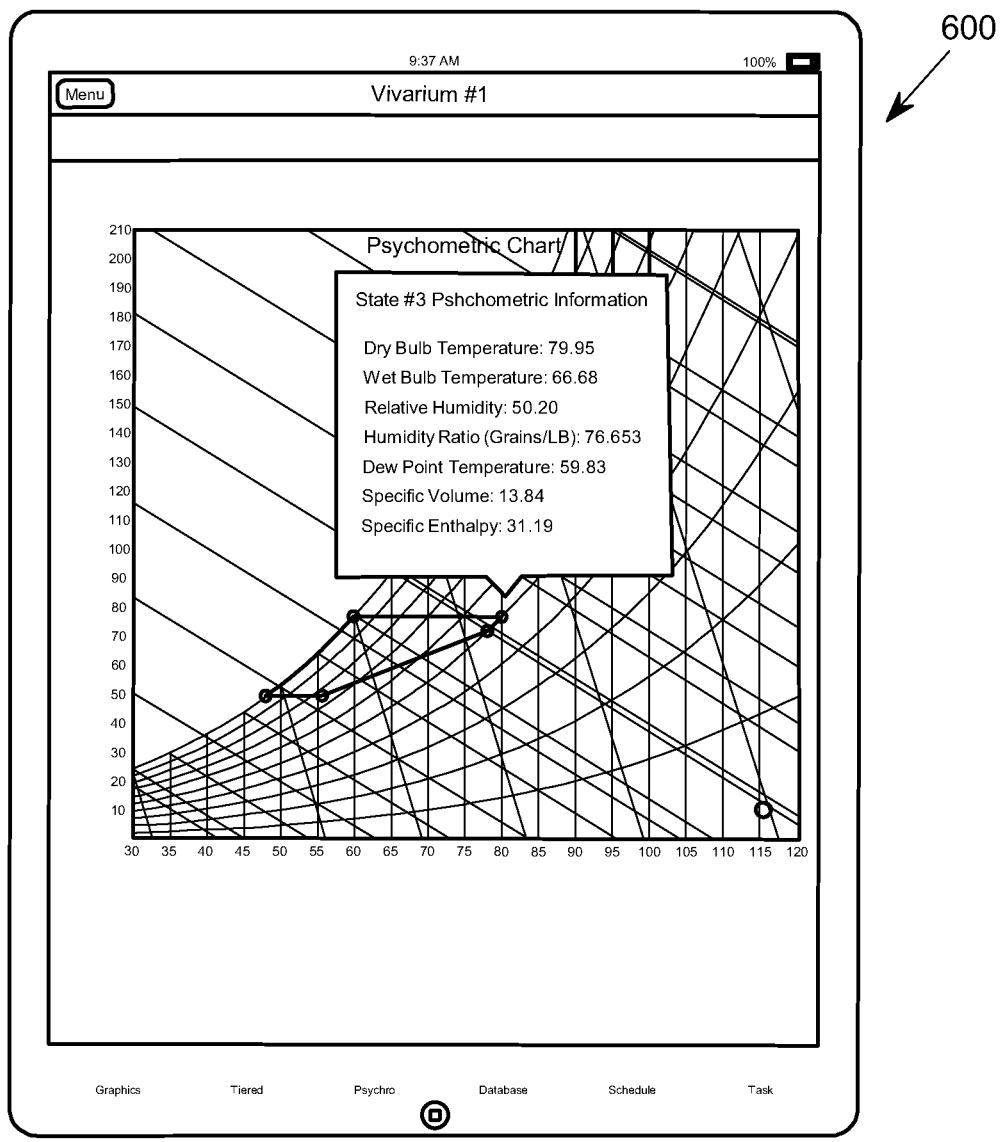
FIG. 6 shows an exemplary screen capture of the mobile computing device of FIG. 2 displaying a psychrometric chart of the building automation system.

As an output result of the model analysis, charts and graphs are generated and displayed on the mobile computing device 300 for the user to visually analyze. As an example, the psychrometric chart 600 of FIG. 6 may be generated by the mobile computing device 300 based on analysis of the AHU 400 of FIG. 4. Such psychrometric charts 600 are known to those of ordinary skill in the art and are configured to provide the user with graphical information related to actual performance and processes being analyzed by displaying thermodynamic indicators (lines, points, areas, etc.) on the applicable chart. The BAS mobile app 322 may use the actual parameters exacted by the data transfer from the BAS 100 as described herein to populate and plot the psychrometric chart 600. In addition to providing charts with respect to actual operation of the AHU 400 and other BAS 100 systems, the BAS mobile app 322 may be further configured to present charts indicating predicted operations under proposed optimization strategies, as explained in further detail below. It will be recognized that the psychrometric chart 600 of FIG. 6 is but one example of a model analysis tool that may be provided by the BAS mobile app 322, and numerous other model analysis tools may be used by the BAS mobile app 322, as will be recognized by those of ordinary skill in the art.

Impulse Response Testing

Once the various points and systems for the BAS 100 are known and modeled, as described above, tests are conducted on them to determine response characteristics. Actual testing of the BAS 100 is useful because different BAS systems, including those of the same inherent design, will have different actual operating and performance characteristics. This could be a result of placement, use, environmental conditions, maintenance procedures, etc. The BAS mobile app 322, through the use of automatic analytic analysis determines and reports the actual system performance and characteristics of the BAS. Determination of system performance and characteristic does not depend solely on the type, configuration, or published performance data of the HVAC system (or other BAS) undergoing the analysis, but on actual operation of the system. To this end, the BAS mobile app 322 performs impulse response testing on the BAS 100.

Impulse response testing involves the issuance of commands to specific devices within the BAS 100 and monitoring the system response. The responses are tracked and used to update the dynamic model based on actual performance characteristics under different operation modes. All of the commands are issued by the BAS mobile application 322. The commands may include command set-points and have the BAS 100 control the system under normal logic operation to the desired state. In other tests the commands will drive the outputs to various positions and states independent of the normal BAS system operation or control logic involved. The responses are generally monitored and recorded via the BAS mobile application 322.

The tests listed below are exemplary impulse response tests that may be conducted on the BAS 100 using the BAS mobile application 322. It will be recognized by those of ordinary skill in the art that numerous additional impulse response tests are possible. Additionally, it will be recognized that different tests may be used in association with different BAS systems depending on the facility and associated limitations.

Minimum/Maximum Test: In this test various set-points of the system are driven to maximum and minimum performance points. The maximum and minimum functions of the system are tested and, if possible, specific and overall capacity is determined. Failures, if any, are monitored and recorded.

Air Handler Unit Maximum Cooling Test: In this test, the chilled water cooling coil set-point for an air handler unit (AHU) is tested at maximum cooling (i.e., lowest temperature). This causes the chilled water value to be driven open to achieve the set-point. If the load of the coil is not increased, this will only verify correct operation of the cooling coils value. To test the coil output potential at maximum conditions, the space temperature is driven up along with a matched fan speed performance to ensure there is a proper load on the coil. This requires a desired additional output from the coil, and allows for determination of the maximum output of the coil.

Tolerance Test: In this test, various stochastic inputs and faults are introduced to the system and the responses are monitored and recorded. Weakness in system stability and flexibility are discovered during this process. These are monitored and recorded. Certification of the system under various inputs can be achieved via this test as well. It is a form of unit testing for systems, as the test can validate responses to various inputs.

Characteristic Discovery: Characteristic discovery tests may be classified into several categories including (1) monitor system under current conditions, (2) turn off system, (3) turn on system, and (4) impulse response testing.

(1) Monitor the System Under Current Conditions: This test allows observation of the various values and characteristics of the system in the unaltered state. This test could include temperature values from sensors, commanded setpoint values, energy consumption, run-time, percentages or use on values and motor controllers, etc.

(2) Turn Off System: This test turns off the system under a normal control sequence. During this test, the BAS mobile app 322 observes and records the system parameters and how they interact and changes to determine the logical flow and order of the system under normal shut-down operations. This observation can include the impact of the system on the other systems and the building utilities and major source plants (chilled water, steam, electrical, etc.). A significant part of this analysis is to ensure the system performs correctly without problems. The test will indicate that the system is functioning automatically and that nothing is in manual or override or otherwise not working in automatic. If any alarm conditions occur due to this process they are noted and their source of occurrence should be resolved.

(3) Turn On System: This test turns on the system under a normal control sequence. The BAS mobile app 322 observes and records the various components and how they interact. The BAS mobile app 322 tracks the flow of logic and the sequence of events that occurs. The amount of time and the chronological steps is significant in this analysis. Additionally, the stabilization time of the system as a whole and the sub-subsystems is determined and monitored during this phase. Related systems, subsystems or components may also be monitored to see the impact this systems has on them. Verification that the system met the set-points and control commands of the logic is observed. Verification with no alarm conditions is made in this process as well. If any alarm conditions occur, they should be corrected and a cause determined and corrected.

(4) Subsystem Impulse Response Testing: On/Off testing is effectively impulse testing on an entire system scale. This test is based on sub-system scale testing (e.g. chilled water loop response to large set point changes). The various responses and response times are monitored and recorded in order to extract actual performance characteristics. The stability of the system is determined and other characteristics are extracted from the results of these tests.

The impulse response testing, as described above, is used for system modeling purposes by the BAS mobile application 322. In addition, impulse response testing may also be used to automatically determine if portions of the system are not performing as intended. The mobile device drives the HVAC system through a sequence of operations and monitors the responses from the various components and subsystems. If there are deviation from the expected results, these conditions are reported as possible maintenance issues. The BAS mobile application 322 is configured to report such conditions.

Furthermore, the BAS mobile app 322 is configured to determine the "Health Status" of the BAS 100 and report the health status by comparison with its published performance characteristics and other known benchmarks. This health status report is used to determine the remaining life cycle duration, provide life cycle predictions based on current operation and budget planning for its eventual replacement.

In addition to health status reports, the BAS mobile app 322 may perform failure risk assessments, particularly for critical buildings and on critical systems of the BAS. As part of the failure risk assessment process it performs "Stress Tests" on the system to determine its ability to perform under required operational situations and modes. This tool may be used in the certification of the system's readiness for critical operations. A report is generated that indicates a system's ability to perform under certain failed conditions and generates standard failure risk assessment reports based on system type and use.

If during the measurement and verification phase the monitored system is determined to be deviating from the predicated results, the BAS mobile app 322 is equipped with algorithms to assist in determining the root cause of the deviation and suggest remedies to correct the problem getting the system back on track to the originally predicated results.

As part of the reporting output function, the BAS mobile app 322 generates detailed performance reports and engineering performance charts and graphs. These reports and graphs are used to better understand the current operating characteristics of the system. The reports, charts and graphs can be used to benchmark performance and track continued operational characteristics over time. As the BAS systems age, their latest performance characteristics are indicated and can be compared to existing benchmarked performance indicators. This information may then be used to measure and assess the maintenance program's effectiveness and also monitor and track needed repairs on the system.

Optimization Strategy

Once the BAS 100 is modeled and impulse response testing is performed, the BAS mobile app 322 analyzes the data and generates one or more optimization strategies for the BAS based on existing system conditions. Optimization strategies may be presented to the user on the graphical user interface 340 of the mobile computing device 300. An optimization strategy is a BAS operation strategy intended to improve the performance of the building system associated with the BAS in some way (e.g., improving efficiency). Optimization strategies are determined based on a selection of goals for the systems (e.g., lower operating cost by reducing electrical consumption, lower the emission of gases, improve the temperature stability of a space, etc.) This selection of goals may be a user selection based on various options presented to the user on the screen of the mobile computing device 300. Alternatively, the BAS mobile app 322 may automatically select goals, depending on the mode of operation.

Once the goals have been selected, the BAS mobile app 322 informs its collection of agents. The agents function in a rational way in order to maximize expected performance. Next, the BAS mobile app 322 creates several unique instances of the BAS and allows the instances to run simultaneously. These unique instances have a limited life span and, unless they show improvements, they terminate.

If improvements are shown in a particular instance of the BAS, these agents are allowed to spawn new instances that will run in their own environments. The BAS mobile app 322 includes a reporting notification mechanism that allows agents to communicate successes and failure to other existing agents. These newly spawned agents follow the same process. This will continue until either the goal is achieved or no further improvements are discovered within an allotted computational time frame as determined by the BAS mobile app 322.

Again, the agents are left to determine the best course of action to achieve the selected goals. This is an interactive iterative process that includes the use of stochastic inputs and evolutionary algorithms that survive only if the goals are approached. The BAS mobile app 322 also includes algorithms that enable the BAS mobile app 322 to destroy agents if their paths are acting in a negative manner to the overall goals.

Once an outcome has been reached, the BAS mobile application 322 performs an analysis of the agents that are successful and determines what changes the agents made to achieve or approach the selected goal. These changes are reported as suggested modification/optimization strategies to the user on the screen of the user interface 340 of the mobile computing device 300. These suggested strategies can be simulated and further analyzed by the BAS mobile app 322 as described in further detail below.

The optimization strategies used by the BAS mobile app 322 may take any of several different forms, but are generally intended to make the system more efficient or effective for its intended purpose. Various optimization strategies implemented by the BAS mobile app 322 may be based on conventional optimization strategies recognized by those of ordinary skill in the art. Examples of optimization strategies include the following:

Reduce energy consumption based on optimal set-point selections;
Chilled water control optimization;
Air side supply air set point;
Static pressure reset;
Reduce energy consumption by improved scheduling;
Identify patterns and optimal start time based on the performance of the system;
Reduce emissions by sequence set-point modifications;
Overall energy reductions;
Boiler control improves;
Alternative energy source uses;
Any of various new strategies determined by the BAS mobile application 322 that are not currently know or defined;

After various optimization strategies are presented, the BAS mobile app 322 is configured to analyze the strategies and present advantages for different strategies. As an example, the BAS mobile app 322 is used to perform the Measurement and Verification (M&V) portions of the implemented optimization strategy. Accordingly, the BAS mobile app 322 benchmarks the system's initial performance characteristics and then tracks the system's actual performance characteristics during a monitored phase. The BAS mobile app 322 is used to automatically acquire the required trended information from the monitored system and automatically generate performance reports and charts that document the actual performance results of the implemented strategy.

The BAS mobile app 322 may also be configured to compare the current life cycle and remaining life cycle duration of the BAS 100 to a predicated life cycle and life cycle duration under other the suggested optimization strategies. Additionally, the BAS mobile app 322 performs prediction analysis and "What if" scenarios. These assessments may be used to assist in the determination of financial predications, as the predications indicate what savings the implemented strategies would provide. The foregoing analysis of optimization strategies may be associated with a simulation of the optimization strategy conducted by the BAS mobile app 322, as explained in further detail below.

Simulation of Optimization Strategies

Once the BAS has been modeled and a recommended optimization strategy has been selected by the user, the BAS mobile app 322 may be used to simulate operations of the BAS 100 under the selected optimization strategy. This simulation may have several options and levels of investigation, including those described in further detail below. Simulation of the BAS 100 generally allows for various input parameter modifications that allow the user to review several simulations based on information changes. For example, the simulation performed by the BAS mobile app 322 may allow the user to select different weather patterns, different occupant loading, difference cost of utilities sources, etc. In one mode, these selections may be manual selections made by a user. However, in a random environmental input mode, the BAS mobile application 322 randomly applies different parameters and allows the user to monitor the results.

Basic Operation Mode

In simulation under the "Basic Operation" mode, the BAS mobile application 322 provides details on revised operation of the BAS 100 under the newly selected strategy. This includes failure/recovery modes, start/stop operations, equipment staging and selection, and various other operations that are part of the new strategy. Accordingly, the "Basic Operation" simulation is used to determine how the strategy will fit within the facilities uses and requirements of the system.

As part of this "Basic Operation" mode, the user determines if the simulated system results in an acceptable operation of the BAS equipment, within the guidelines of the user's maintenance programs, and redundancy requirements. This mode is not used to determine optimization or efficiency based on the new strategy. Instead, this mode is used to judge acceptability of the system's operation under the new strategy. This mode can also be used as a training tool for new employee or a means to introduce the revised operational strategy.

In addition to the above, the "Basic Operation" mode can also be used to run "what if" scenarios on the systems in question. This allows the user to except what should happen giving the revised logic operations.

Comparison Mode

As part of the original analysis performed with the BAS mobile device 322, the initial operation and performance of the BAS was determined and stored. This data and its characteristics forms a "before" system profile. This "before" system profile may be compared with other similar system types and ranked. This benchmarking is taken into account when making the suggestions of possible improvements for the specific system.

Measurement and Verification Mode:

Once an optimization selection is implemented and underway, this mode provides the necessary monitoring and reporting capabilities to document the actual performance in comparison with both the original implementation and the planned new strategy.

Corrective Track Mode

If measurement and verification results indicate that the projected results are not being obtained (e.g., lower than expected results or higher than expect result) a corrective track mode may be used to show how to get the system back on track to met the originally projected results (i.e. with lower than expected results). The user may also make modifications to the original targets to lower or increase them as well (e.g., for higher than expected results). In this mode, the system will make suggestions to the user and the user will be provided with the opportunity to simulate the recommended modifications. The user may then determine if the modifications it acceptable or not. If the user implements any modifications the BAS mobile app 322 can track performance in the measurement and verification mode as well. The system will track these changes as they are made in a change log system. This allows the user to monitor changes and their impact on the systems performance.

In addition to continued system analysis, simulations may be useful for various additional purposes. For example, simulations enhance training and provide a more detailed understanding of the intended operation. Thus, simulations are useful to educate users and facilitate their acceptance of the selected operational strategy. Interactive use is helpful during the commission and acceptance phase, by allowing the sequence logic to be tested and challenged without interfering with the actual system's operation. Once the building managers are in agreement with the final sequence logic, it can be implemented on the actual system limiting disturbances to the system's users.

Summary of BAS Mobile App Operation

Figure 7:
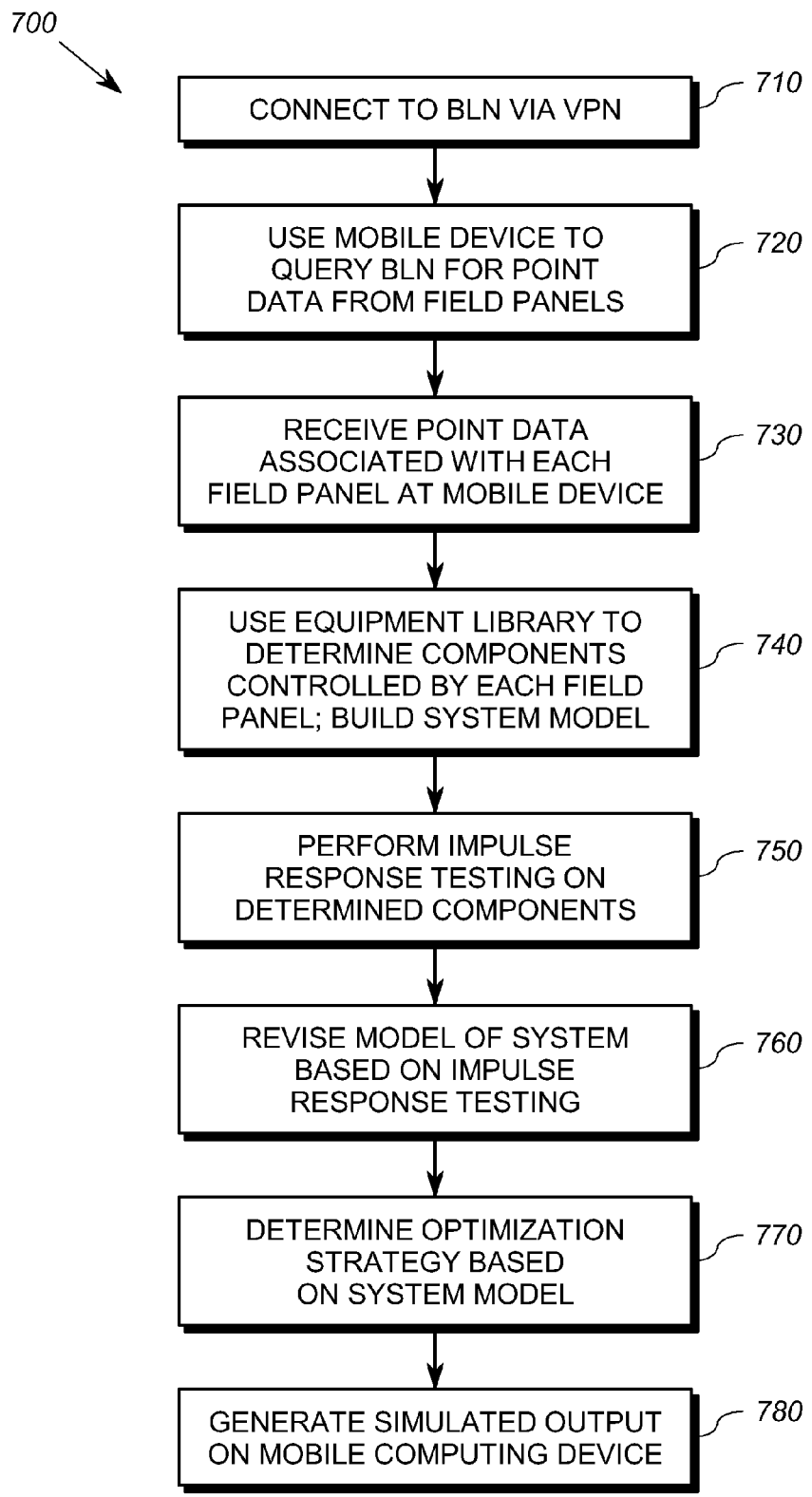
FIG. 7 is a flowchart depicting an exemplary process performed by a mobile application provided in the mobile computing device of FIG. 2.

FIG. 7 shows a flow chart 700 summarizing the general operation of the BAS mobile application 322 described above. As shown in FIG. 7, operation of the BAS mobile app 322 begins with step 710 when the BAS mobile application 322 detects the existence of the BAS 100 and connects to the BLN 112 (or other BAS network) via the VPN (or WiFi or other wireless access). Next, following connection to the BLN 112, the BAS mobile app 322 queries the BAS in step 720 for point data concerning the BAS 100, as described above. This information may be acquired from field panels 160a-b, controllers 108a-e, or other BAS devices configured to transmit point data. In step 730, the point data is received and stored in the wireless computing device 300. Thereafter, in step 740, the BAS mobile app 322 uses the equipment library 325 and other files to determine the components of the BAS 100 and connection between such components. The BAS mobile app 322 then creates an initial model of the BAS 100 based on the received point data, as described above.

With continued reference to FIG. 7, after an initial model of the BAS 100 is created, the BAS mobile app 322 continues processing at step 750 and performs impulse response testing on various components of the BAS, as described above. Based on the results of this impulse response testing, the BAS mobile app 322 revises the model of the system in step 760. The BAS mobile app 322 then continues processing in step 770 by determining one or more optimization strategies for the BAS 100 based on the created system model. Next, in step 780, the BAS mobile app simulates outputs for the BAS 100 for one or more selected optimization strategies and displays the simulated outputs on the user interface 340 of the mobile computing device 300.

As set forth above, through the use of machine learning algorithms, the mobile device automatically determines and categorizes the targeted HVAC system based on type, size, and environmental condition/factors e.g. type of system: air handler, chiller, heat exchanger, boiler, pumps etc. This automatic categorization is used to further qualify optimization strategies and process improvement schemes. Once optimization strategies are qualified, the categorization of the system may be further refined based on the generated mathematical models and the simulated responses to the optimization selection.

The foregoing detailed description of one or more embodiments of the BAS mobile app have been presented herein by way of example only and not limitation. It will be recognized that there are advantages to certain individual features and functions described herein that may be obtained without incorporating other features and functions described herein. Moreover, it will be recognized that various alternatives, modifications, variations, or improvements of the above-disclosed embodiments and other features and functions, or alternatives thereof, may be desirably combined into many other different embodiments, systems or applications. Presently unforeseen or unanticipated alternatives, modifications, variations, or improvements therein may be subsequently made by those skilled in the art which are also intended to be encompassed by the appended claims. Therefore, the spirit and scope of any appended claims should not be limited to the description of the embodiments contained herein.

What is claimed is:

1. A method of controlling a building automation system, the building automation system including a plurality of components and each of the plurality of components having point data associated therewith, the method comprising:
   establishing communications between a mobile computing device and a building automation network of the building automation system; and
   through operation of the mobile computing device, generating a graphical model and a performance model of the building automation system based on point data for each of a plurality of respective components of the building automation system,
      which point data respectively identifies each of the respective components of the building automation system,
      which point data is queried in real-time from at least one component of the building automation system via the building automation network,
      wherein the graphical model depicts at least one grouping of at least portions of the components grouped together with respect to locations, systems, and/or subsystems in an illustration of a physical configuration of the building automation system,
         which at least one grouping is determined during generation of the graphical model based on correspondence between portions of the respective point data for each of the components in the at least one grouping, which portions include at least one of: point name, point description, point value, point units, panel association, or any combination thereof,
   through operation of the mobile computing device, generating an optimization strategy for at least one of the components on the mobile computing device, the optimization strategy based at least in part on the performance model of the building automation system and impulse response testing conducted on the at least one component.

2. The method of claim 1 further comprising sending commands from the mobile computing device in order to conduct the impulse response testing on the at least one component.

3. The method of claim 2 further comprising generating a revised performance model based on the impulse response testing conducted on the at least one component.

4. The method of claim 1 wherein the graphical model displayed on the mobile computing device.

5. The method of claim 3 further comprising determining the at least one optimization strategy for the at least one component based on the generated revised performance model.

6. The method of claim 5 wherein the at least one optimization strategy for the at least one component is displayed on the mobile computing device.

7. The method of claim 5 further comprising implementing the at least one optimization strategy by sending commands from the mobile computing device to a field panel of the building automation system.

8. The method of claim 1 wherein the building automation system comprises an HVAC system.

9. An arrangement comprising:
a building automation system including a plurality of components, each of the plurality of components having point data associated therewith that respectively identifies each of the respective components of the building automation system;
a mobile computing device in wireless communication with the building automation system, the mobile computing device configured to:
receive respective point data for each of the plurality of respective components that is queried from at least one component of the building automation system in real time; and
identify the plurality of components based on the received point data, and generate a graphical and a performance model of the building automation system based on the received point data,
wherein the graphical model depicts at least one grouping of at least portions of the components grouped together with respect to locations, systems and/or subsystems in an illustration of a physical configuration of the building automation system,
which at least one grouping is determined during generation of the graphical model based on correspondence between portions of the respective point data for each of the components in the at least one grouping, which portions include at least one of: point name, point description, point value, point units, panel association, or any combination thereof,
generating an optimization strategy for at least one of the components on the mobile computing device, the optimization strategy based at least in part on the performance model of the building automation system and impulse response testing conducted on the at least one component.

10. The arrangement of claim 9 wherein the mobile computing device is further configured to conduct the impulse response testing on at least one of the components of the building automation system.

11. The arrangement of claim 10 wherein the mobile computing device is further configured to generate a revised performance model of the building automation system based on the impulse response testing conducted on the at least one component.

12. The arrangement of claim 9 wherein the mobile computing device is configured to display a graphical representation of the graphical model of the building automation system.

13. The arrangement of claim 11 wherein the mobile computing device is further configured to determine the at least one optimization strategy based on the revised performance model.

14. The arrangement of claim 13 wherein the mobile computing device is configured to display the least one optimization strategy for the at least one component.

15. The arrangement of claim 13 wherein the mobile computing device is configured to implement the at least one optimization strategy by sending commands from the mobile computing device to the building automation system.

16. The arrangement of claim 9 wherein the building automation system comprises an HVAC system.

17. A method of improving the performance of an HVAC system including a building automation system, the method comprising:
wirelessly connecting a mobile computing device to a network of the building automation system;
generating a graphical model and a performance model of the building automation system in the mobile computing device based at least in part on received point data for each of a plurality of respective components of the building automation system,
which point data respectively identifies each of the respective components of the building automation system,
which point data is queried in real time from at least one component of the building automation system via the network,
wherein the graphical model depicts at least one grouping of at least portions of the components grouped together with respect to locations, systems, and/or subsystems in an illustration of a physical configuration of the building automation system,
which at least one grouping is determined during generation of the graphical model based on correspondence between portions of the respective point data for each of the components in the at least one grouping, which portions include at least one of: point name, point description, point value, point units, panel association, or any combination thereof;
performing impulse response testing on the building automation system using commands sent wirelessly from the mobile computing device to the building automation system via the network; and
generating an optimization strategy for at least one of the components on the mobile computing device, the optimization strategy based at least in part on the performance model of the building automation system and the impulse response testing.

18. The method of claim 17 further comprising revising the performance model of the at least one component based on the impulse response testing.

19. The method of claim 17 further comprising simulating the at least one optimization strategy for the building automation system with the mobile computing device.

20. The method of claim 17 further comprising displaying the graphical model of the building automation system on the mobile computing device and displaying the optimization strategy for the building automation system on the mobile computing device.

* * * * *